Figure 1:
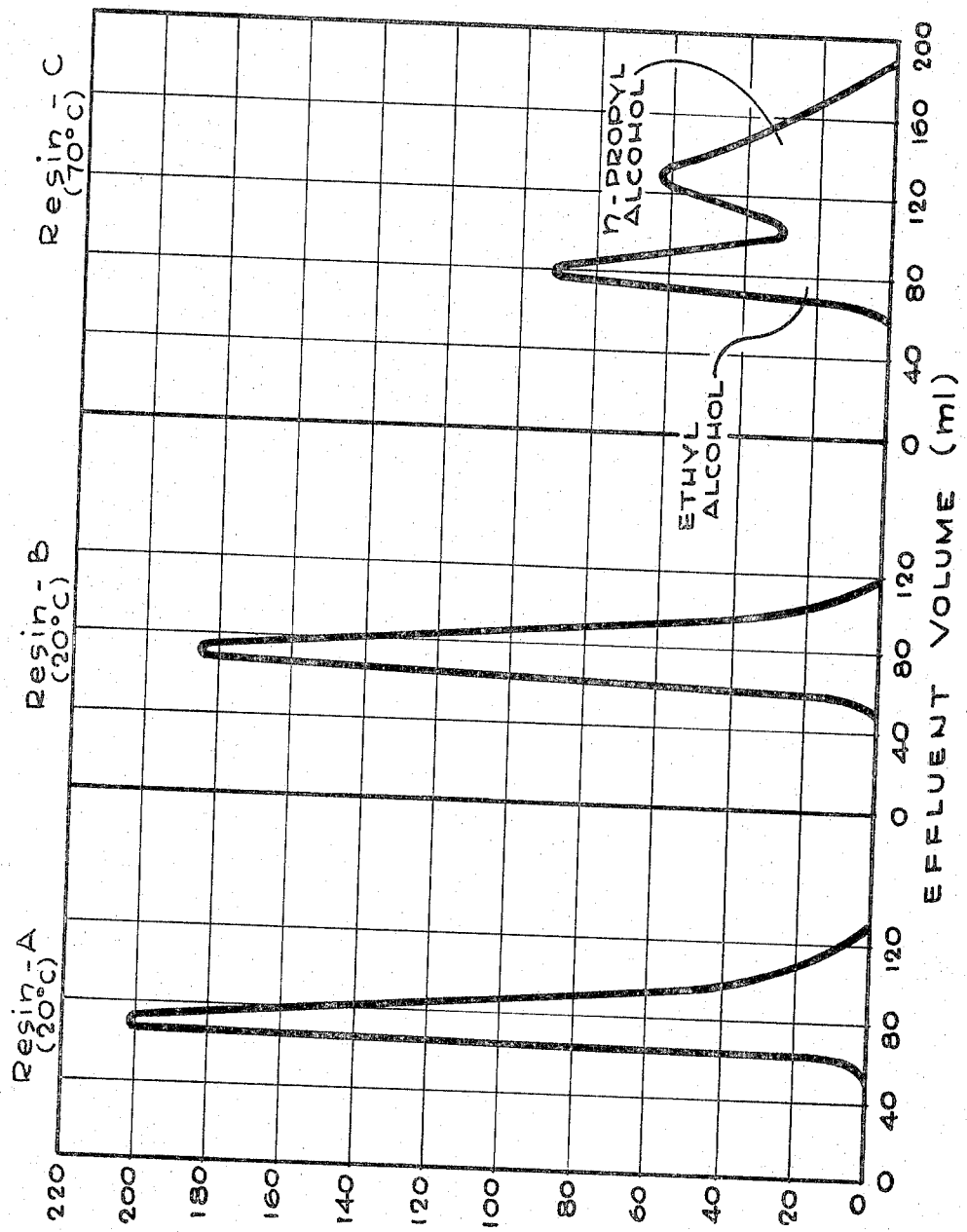

INVENTOR:
Hamish Small
BY Alice O. Robertson
AGENT 3,315,002
METHOD OF SEPARATION OF LOWER ALKYL MONO- AND DIALCOHOLS, ACETONE AND METHYLETHYLKETONE, AND ETHYLAMINE AND BUTYL AMINE WITH NOVEL ION EXCHANGE RESIN DERIVATIVES
Hamish Small, Midland, Mich., assignor to The Dow Chemical Company, Midland, Mich., a corporation of Delaware
Filed Sept. 24, 1962, Ser. No. 225,809
2 Claims. (Cl. 260—637)

This invention concerns sorption, and is more particularly concerned with novel sorptive resins and methods for separation non-ionic solutes from mixtures thereof in aqueous solutions.

Ion-exchange resins have been used as stationary phases in chromatographic separations of two or more ions by elution with solutions of electrolytes, the separation of electrolytes from non-electrolytes by elution with water, and the separation of a few non-electrolyte mixtures by elution with water. However, applications to separations of certain non-electrolyte mixtures have been rendered impractical because the selectivities shown by the resins for one component in a mixture over another are so slight that their economic exploitation is rendered extremely doubtful. Although effectiveness of separation may be increased by use of electrolyte eluants in place of water, the electrolyte eluants introduce problems when applied to the separation of large amounts of non-ionic materials. Thus, the use of electrolyte eluants introduces problems in (1) a need for separation of eluting solute from the constituents of a resolved mixture and (2) in a reduced solubility of non-ionic mixtures which frequently would render impracticable large scale operation.

The novel sorptive resins of the present invention have a polymeric skeleton with ionic sites on the polymer skeleton and exchanged thereon counter-ions which bear at least one long chain alkyl substituent containing from 6 to 18 carbon atoms. The resins are amphiphilic in nature and will hereinafter be referred to as the amphiphilic resins. These resins are useful for the separation of non-ionic solutes. Moreover, the novel resins of the present invention provide a method for the separation of such non-ionic solutes as members of the same homologous series. The novel sorptive resins are not only useful as analytical tools but are adaptable to be employed in methods for large scale separations.

The polymeric skeletons of the amphiphilic resins are basically those of the conventional ion-exchange resins having a hydrocarbon back bone with cationic or anionic sites. The counter-ions exchanged thereon are totally non-analogous to the conventional counter-ions. Suitable counter-ions are those containing at least one long-chain alkyl substituent containing from about 6 to 18 carbon atoms and are either cationic or anionic, depending on the anionic or cationic nature of the resin. Typical anions are stearate, oleate, n-heptylate, pelargonate, caproate, caprylate, caprate, n-undecoate, undecylenate, laurate, myristate, palmitate, margarate, myristolenate, palmitolenate, isooleate, petroselate, erucate, brassidate, cetoleate, nervonate, di(2-ethylhexyl)phosphate, lauryl sulfate, cetyl sulfate, stearyl sulfate, octyl sulfate, monolauryl phosphate, monoheptadecyl phosphate and lauryl benzenesulfonate. Typical cations include laurylpyridinium, stearyltrimethylammonium, cetyldimethylbenzylammonium, stearyltriethylammonium, cetyldimethylethylammonium, laurylmorpholinium and cetylquinolinium.

The amphiphilic resins of the present invention may be prepared by equilibrating the hydrogen or hydroxide form of a conventional io nexchange resin with an appropriate long chain base or acid in methanol and water. The degree of substitution by the long chain counter ion may be controlled by application of stoichiometry to the appropriate acid or base and the exchange resin. By "conventional exchange resin" is meant weak or strong cation and anion exchangers as the terms are known in the art and include totally synthetic polymeric materials as well as natural materials which have been modified by chemical treatment to produce ion exchange properties. An example of natural material modified by chemical treatment to provide exchange properties is sulfonated coal. Examples of completely synthetic ion exchange resins are those having a polymeric skeleton such as phenolformaldehyde, polystyrene, polyolefins, olefinmaleic anhydride copolymers, polyoxyalkylene and polyalkyleneimine compounds and the like and containing acidic and basic groups capable of exchanging cations and anions. Cation exchangers generally contain the groups —OH, —COOH, —PO(OH)$_2$ or —SO$_3$H or their exchangeable alkali metal salts. Anion exchangers contain primary, secondary or tertiary amino or quaternary ammonium groups, in the free base or as simple salt forms, e.g., as chloride or bromide. Suitable resins are available under various trade names. Illustrative of useful resins are Dowex 50 and 50W resins, (cation exchange resins of polystyrene nuclear sulfonic acid type), Dowex I resin, Dowex 11 and 21K resin (anion exchange resins of the polystryrene nuclear trimethylbenzylammonium type), Dowex 2 resin (anion exchange resin of polystyrene nuclear dimethylethanolbenzylammonium type) and Dowex 3 resin (anion exchange resin of polystyrene nuclear polyamine type). The resins may be cross-linked in the usual ways. Dowex resins are designated, for example, as X4 for 4 percent cross-linked. The extent of crosslinking considered desirable in the resin is up to about 2 percent. The amphiphilic resins produced from highly cross-linked resins react in the methods of the present invention at considerably slower rates. Thus, while highly cross-linked resins are not inoperable, they are less efficient. The physical properties of the amphiphilic resins of the present invention are similar to those of conventional ion exchange resins but have, in addition, unusual swelling properties in organic solvents not possessed by conventional ion exchange resins.

The amphiphilic resins of the present invention are suitable for use in new methods of separation of mixtures of non-ionic solutes into their components. By use of the amphiphilic resins, separations are possible of even similar non-ionic solutes such as mixtures of members of a homologous series. The novel resins and method permit use of unmodified water for elution, rendering this process readily adaptable to, and practicable in, large scale operations. Typical non-ionic solutes which may be separated employing the amphiphilic resins of the present invention include mixtures of mono- and polyhydric alcohols, amines, ketones, esters, ethers and acids. For effective separation, all components of the mixture which is to be separated according to the present invention must have some water-solubility. For mixtures of compounds having high water solubility, the resins and methods of the present invention are readily applicable both for large scale preparative procedures and for small scale analytical procedures. For compounds having low water solubility, the compositions and methods are more suitable for analytical procedures.

The particular resin to be employed for the separation of mixtures of non-ionic solutes depends on the particular mixture to be separated as well as other factors such as time, size of operations, etc. While a resin containing 100 percent amphiphilic counter-ion substitution gives the maximum separation of non-ionic solutes, better water-swelling properties and better reaction kinetics are obtained when the resins are substantially but not completely in the amphiphilic form. Thus, a useful separation may be effected when the resin contains a minor proportion of conventional counter-ions. For example, it has been found that in the separation of a mixture of alcohols with quaternary ammonium resin with di(2-ethylhexyl) phosphate counter-ion, greatest efficiency is obtained when 90 percent of the counter-ion is di(2-ethylhexyl)phosphate and the remainder chloride. The optimum conditions are readily determinable by the skilled in the art.

In employing the resins and methods of the present invention, a mixture of solutes or a solution of a mixture of solutes in water is applied to the resin in a conventional manner and thereafter water is applied thereto to provide stepwise elution of the components. The solution containing the mixture to be separated may contain as little as 1 percent or less by weight of total solutes but preferably contains from 10 to 100 percent by weight of total solutes. The separation may be carried out at temperatures of from about 15° C. to about 100° C. While increase in temperature has not been found to vary the retentivity by conventional resin for non-ionic materials, the retentivity of the latter by the novel sorptive resins of the present invention is affected by increase in temperature. The extent of effect on retentivity is not the same for every non-ionic solute. The increase in retentivity appears to be greater for more lipophilic solutes; hence, separation of a mixture containing a solute which may be considered more lipophilic than others is generally facilitated by carrying out the separation at somewhat elevated temperatures. The exact flow rate is not critical and may be varied in consideration of such factors as concentration of the solute mixture in the solution, temperature, size of bed, nature of resin bed, particle size of resin, etc. In recovering the components from the effluent fluid, appropriate fractions may be collected by following a physical property of the effluent fluid such as refractive index.

It is to be noted that selection of conditions may vary with the purpose to which the compositions and methods of the present invention is to be directed. Thus, when the invention is to be used as an analytical tool so that relatively small amounts of materials are to be employed and so that maximum separation rather than speed is of prime importance, conditions are adjusted to give maximum resolution of components. On the other hand, when the methods and compositions of the invention are to be employed as part of a preparative step or a purification step in production methods, the conditions may be readily adjusted to provide for useful separation rather than complete resolution.

In carrying out the separation, a mixture or an aqueous solution of a mixture of solutes to be separated is carefully applied at the top of the novel amphiphilic resin bed and the feed allowed to enter and pass through the resin bed at an appropriate flow rate. As a result of this step, the solutes are selectively adsorbed on the resin bed. When the level of the feed solution has dropped to the level of the resin bed, water is carefully layered above the resin bed and allowed to flow through the resin bed, whereupon the water selectively dissolves a particular solute adsorbed on the bed until it has been substantially completely removed therefrom and thereafter selectively dissolves a second preferred solute until it is completely removed and so on. Appropriate fractions are determined according to a suitable physical property of the effluent solution. Any suitable physical property which distinguishes the components may be employed. Refractive index of the effluent fluid has been found to be most convenient. The solutes may then be recovered by appropriate concentration or evaporation procedures.

The following examples illustrate the invention but are not to be construed as limiting:

*Example 1.—Dowex 1-X1 di(2-ethylhexyl)phosphate resin*

354 grams of water-swollen Dowex 1-X1 (commercial trimethylbenzylammonium type anion exchange resin, 1 percent cross-linked) resin in the OH⁻ form, having an exchange capacity of 0.376 meq./g. (milliequivalents per gram), was mixed with a suspension of 43 grams (0.133 equivalent) of di(2-ethylhexyl)phosphoric acid in 50:50 water-methanol and the mixture shaken overnight to obtain the desired amphiphilic resin, Dowex 1-X1 di(2-ethylhexyl)phosphate resin. The resulting product is hereinafter referred to as Dowex 1-X1 (D2EHP⁻) resin and may be represented diagrammatically as

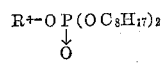

where R⁺ represents the hydrocarbon backbone containing the trimethylbenzyl ammonium functional group of the Dowex 1-X1 resin, and the remainder is the di(2-ethylhexyl)phosphate anionic counter-ion.

*Example 2.—Dowex 1-X2 stearate resin*

In a manner similar to that described in Example 1, 150 grams of Dowex 1-X2 resin in the OH⁻ form was mixed with a suspension of 34.8 grams of stearic acid in 50:50 water-methanol and the mixture shaken overnight to obtain the desired amphiphilic Dowex 1-X2 stearate resin.

*Example 3.—Dowex 1-X2 oleate resin*

In a similar manner, 150 grams of Dowex 1-X2 resin in the OH⁻ form was mixed with a suspension of 35.4 grams of oleic acid in 50:50 water-methanol and the mixture shaken overnight to obtain the desired amphiphilic Dowex 1-X2 oleate resin.

*Example 4.—Dowex 1-X1 monoheptadecylphosphate resin*

In a similar manner, 200 grams of Dowex 1-X1 resin in the OH⁻ form was mixed with a suspension of 7.5 grams of monoheptadecylphosphoric acid in 50:50 water-methanol and shaken overnight to obtain the desired amphiphilic Dowex 1-X1 monoheptadecylphosphate resin.

*Example 5.—Dowex 50-X2 cetyldimethylethylammonium resin*

In a similar manner, 43.8 grams of water-swollen Dowex 50-X2 resin (cation exchange resin sulfonic acid type) in the H⁺ form (1.63 meq./g. was mixed with 1 liter of 0.0675 molar cetyldimethylethylammonium hydroxide in water and the mixture shaken overnight to obtain the desired amphiphilic Dowex 50 cetyldimethylethylammonium resin wherein the cetyldimethylethylammonium is the cationic counter-ion.

*Example 6*

In a similar manner, the following amphiphilic resins are prepared:

Dowex 1-X1 palmitate resin from Dowex 1-X1 hydroxide resin and palmitic acid.

Dowex 1-X1 laurate resin from Dowex 1-X1 hydroxide resin and lauric acid.

Dowex 1-X1 caprate resin from Dowex 1-X1 hydroxide resin and capric acid.

Dowex 1-X2 stearate resin from Dowex 1-X2 hydroxide resin and stearic acid.

Dowex 1-X2 stearate resin from Dowex 1-X4 hydroxide resin from stearic acid.

Dowex 2-X1 oleate resin from Dowex 2-X1 resin (dimethylethanol benzylammonium, 1% cross-linked) hydroxide and oleic acid.

Dowex 2-X2 myristate resin from Dowex 2-X2 and myristic acid.

Dowex 3 laurate resin from Dowex 3 resin (amine anion exchanger) in the hydroxide form and lauric acid.

Dowex 50-X2 lauryltrimethylammonium resin from Dowex 50-X2 resin and lauryltrimethylammonium hydroxide.

Dowex 50-X4 oleyltrimethylammonium resin from Dowex 50-X4 resin and oleyltrimethylammonium hydroxide.

Dowex 1-X1 laurylbenzenesulfonate resin from Dowex 1-X1 hydroxide resin and laurylbenzenesulfonic acid.

*Example 7*

In separate operations, three resin beds were prepared each having a volume of 85 milliliters of resin as follows:

(1) Resin A—Dowex 50-X8 resin with hydrogen counter ion
(2) Resin B—Dowex 1-X4 resin with chloride counter ion
(3) Resin C—Dowex 1-X1 resin with di(2-ethylhexyl) phosphate counter ion The resins were loaded in a ½ inch (internal diameter) burette-type column with water as the interstital fluid. The column holding Resin C was jacketed and maintained at 70° C.; the remaining columns were at 20° C. The water employed in loading the column was allowed to drain until the water level was lowered to the resin level. 85 milliliters of an aqueous feed composition containing 20 percent ethanol and 20 percent n-propyl alcohol was carefully applied at the top of the resin bed and the feed allowed to enter the resin bed at a flow rate of 1 milliliter per minute (0.2 gallon per minute per square foot of bed) and to be adsorbed thereon. When the level of the feed solution had dropped to the resin level, 10 milliliters of water were carefully applied at the same rate, followed by additional water to carry out the elution at the same rate. Refractive indices of the effluent fluid were taken during the period of elution and elution continued until all of the solute had been determined to have been recovered from the column. The results, shown diagrammatically in FIGURE 1 where change in refractive index at 40° C. ($\Delta n_D^{40}$) is plotted against volume of effluent fluid in milliliters, indicate that no separations were obtained when employing conventional resins, Resin A and Resin B, but good separation was obtained with Resin C, an amphiphilic Dowex 1-X1 (D2EHP−) resin.

*Example 8*

Figure 2:
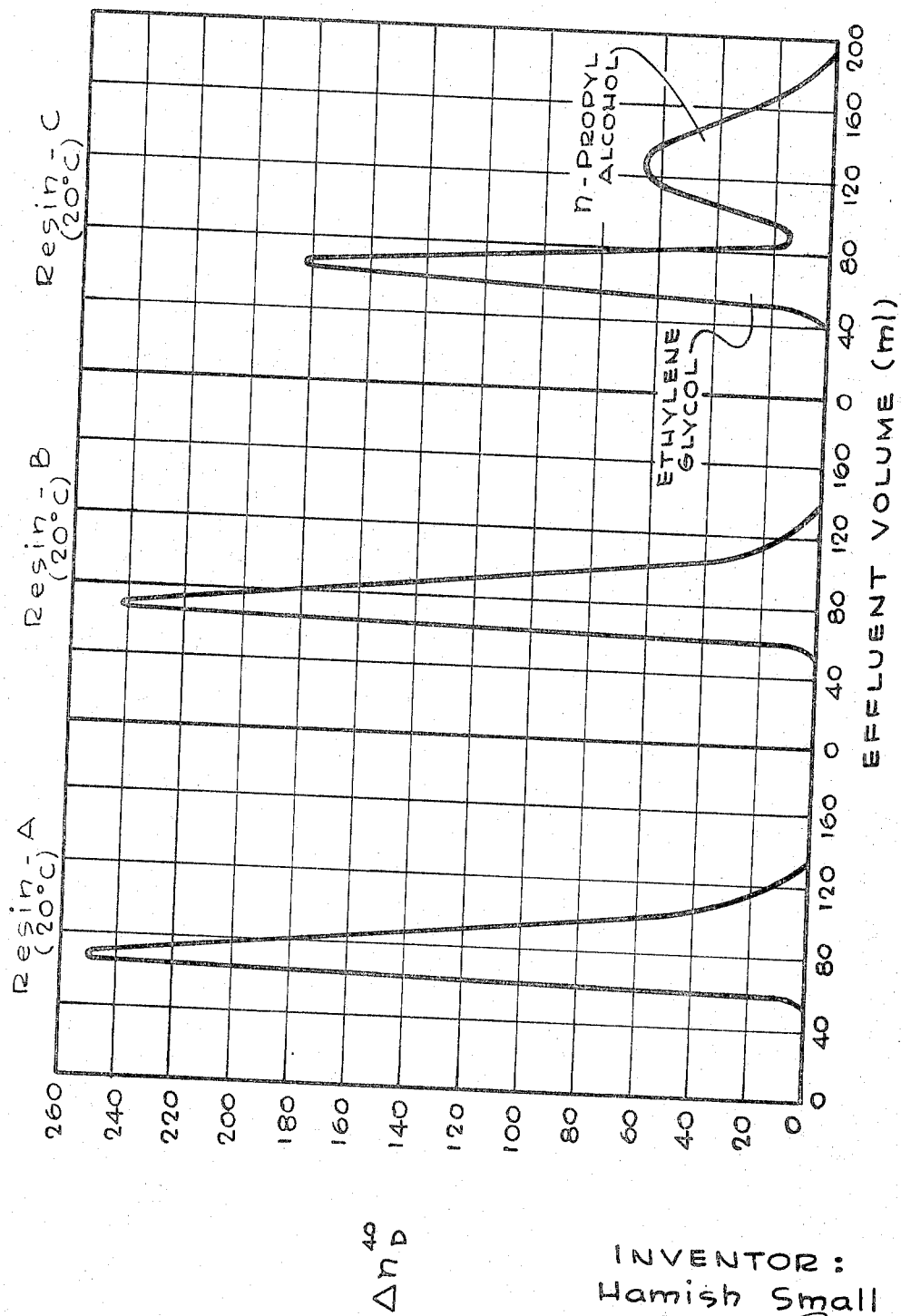

In operations carried out in a manner similar to that described in Example 7, resin beds were prepared with Resins A, B and C as above defined, each with volume of 85 milliliters. All three columns were maintained at 20° C. In a manner previously described, 20 milliliters of an aqueous feed composition containing 20 percent ethylene glycol and 20 percent n-propyl alcohol was applied to the top of the resin bed, adsorbed on said bed and thereafter eluted as previously described. The results expressed in $\Delta n_D^{40}$ vs. effluent volume shown diagrammatically in FIGURE 2 demonstrate that no separation occurred with conventional resins but good separation was obtained with amphiphilic Dowex 1-X1 (D2EHP−) resin.

*Example 9*

Figure 3:
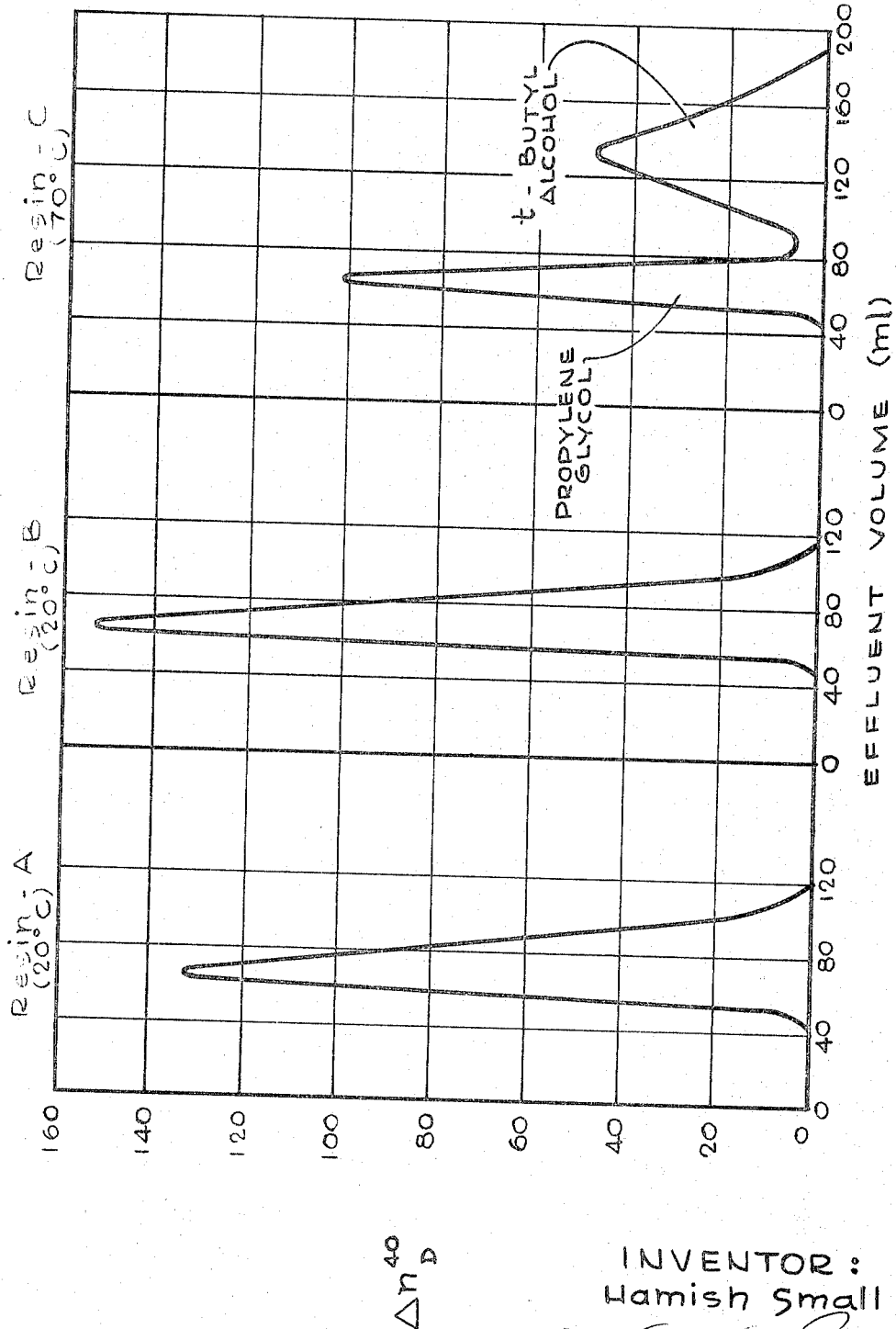

In similar operations, beds were prepared with Resins A, B and C. Resin beds A and B were maintained at 20° C. and Resin bed C at 70° C. In a manner previously described, 10 milliliters of an aqueous feed composition containing 20 percent propylene glycol and 20 percent t-butyl alcohol was applied to the top of the resin bed, absorbed on said bed and thereafter eluted as previously described. The results expressed in $\Delta n_D^{40}$ vs. effluent volume shown diagrammatically in FIGURE 3 demonstrate that no separation occurred with conventional resins but good separation was obtained with amphiphilic Dowex 1-X1 (D2EHP−) resin or Resin C.

*Example 10*

Figure 4:
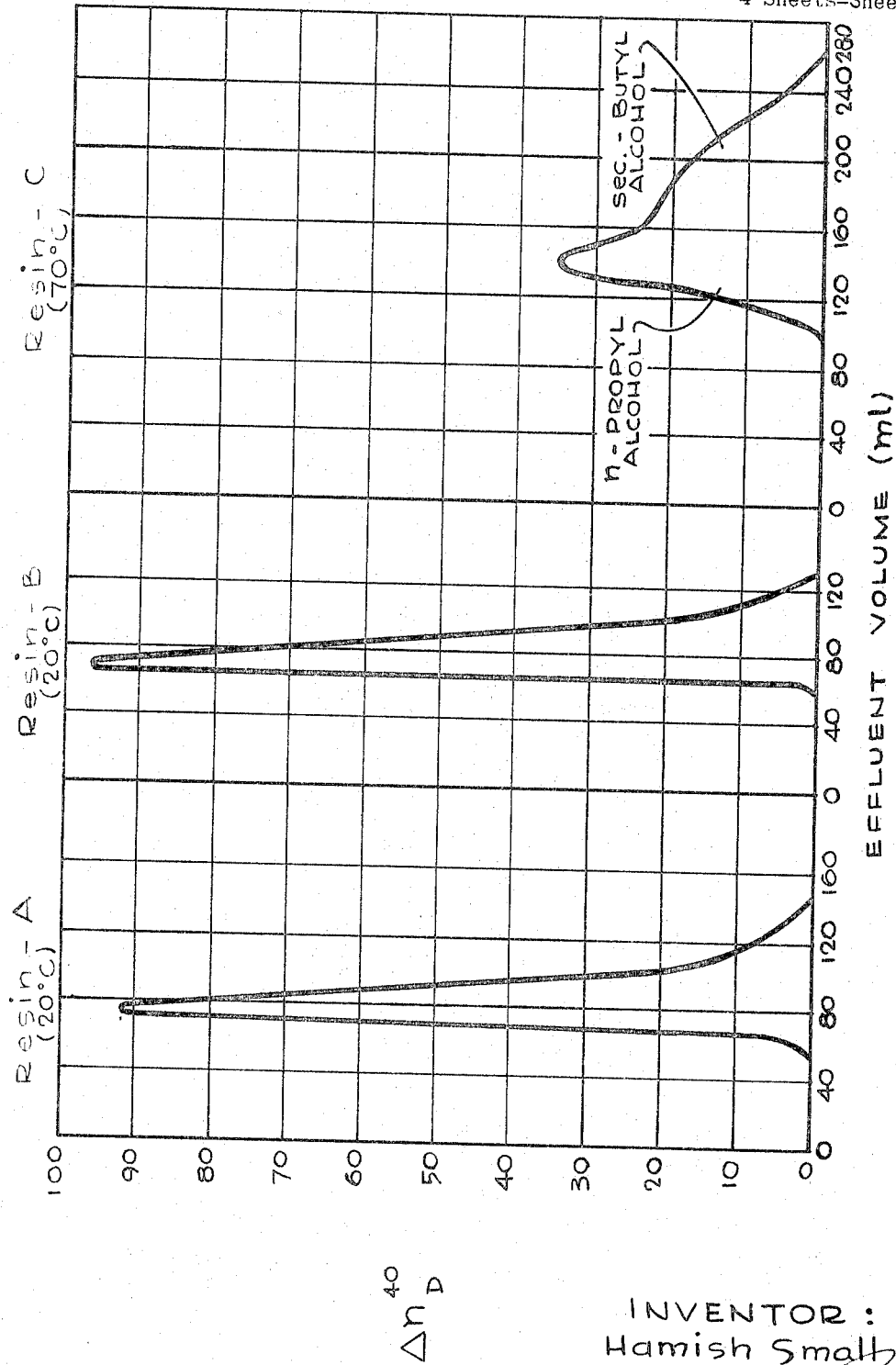

In similar operations, beds were prepared with Resins A, B and C. Resin beds A and B were maintained at 20° C. and Resin bed C at 70° C. In a manner previously described, 10 milliliters of an aqueous feed composition containing 20 percent n-propyl alcohol and 10 percent secondary-butyl alcohol was applied to the top of the resin bed, absorbed on said bed and thereafter eluted as previously described. The results expressed in $\Delta n_D^{40}$ vs. effluent volume shown diagrammatically in FIGURE 4 demonstrate that no separation occurred with conventional resins but useful separation occurred with Resin C.

*Example 11*

Dowex 1-X2 stearate resin is prepared as described in Example 2. In a manner similar to that described in Example 7, a resin bed of 200 milliliters volume is prepared of Dowex 1-X2 stearate resin and loaded with water at 50° C. Thereafter, while maintaining the column at 50° C., 200 milliliters of an aqueous feed composition containing 20 percent by weight of methyl ethyl ketone and 40 percent by weight of acetone is carefully applied at the top of the resin bed and the feed allowed to enter the resin bed at a flow rate of 0.2 gallon per minute per square foot of bed to be adsorbed thereon. When the feed solution has entered the bed, water is carefully applied thereto and the effluent fluid collected until the ethyl ketone and the acetone has been recovered in separate fractions.

*Example 12*

In a smiliar manner, 200 mililiters of a 50 percent ethylamine and 50 percent butylamine mixture is applied at room temperature to the top of a wet, 200 milliliter resin bed of Dowex 1-X2 stearate resin and the mixture allowed to flow into the bed to be adsorbed thereon. Thereafter, water is applied to the bed and the ethylamine and butylamine collected as separate fractions of the aqueous effluent.

In addition to use in the novel methods of the present invention, the novel resins of the present invention are also useful as ion retardation resins for the separation of ionic mixtures such as, for example, separations into components, mixtures of sodium chloride and sodium iodide, or mixtures of sugar and sodium chloride.

I claim:

1. A method for separating mixtures of (a) lower straight and branched chain alkyl monoalcohols and dialcohols, (b) acetone and methylethylketone or (c) ethylamine and butylamine, which comprises
    (1) applying said mixture on a resin bed of an amphiphilic sorptive resin consisting of a conventional ion exchange resin having a polymeric vinylaromatic matrix, said matrix being free of reactive substituents other than its ion exchanging groups, a major proportion of the counter ions of which have been exchanged for ionic 6–18 carbon alkyl groups, and
    (2) eluting said solutes from the resin bed with water, said separations being carried out at a temperature between 15° and 100° C.

2. A method for separating mixtures of lower straight and branched chain alkyl monoalcohols and dialcohols which comprises
    (1) applying a member of the group consisting of mixtures of said alcohols and aqueous solutions thereof on a resin bed of an amphiphilic sorptive resin consisting of a conventional ion exchange resin having a polymeric vinylaromatic matrix, said matrix being free of reactive substituents other than its ion exchanging groups, a major proportion of the counter ions of which have been exchanged for ionic 6–18 carbon alkyl groups, and (2) eluting the alcohols from the resin bed with water, said separations being carried out at a temperature between 15° and 100° C.

References Cited by the Examiner

UNITED STATES PATENTS

| | | | |
|---|---|---|---|
| 2,772,237 | 11/1956 | Bauman et al. | 260—637 |
| 2,911,362 | 11/1959 | Wheaton | 260—583 |
| 3,123,553 | 3/1964 | Abrams | 260—2.1 |
| 3,134,814 | 5/1964 | Sargent et al. | 260—637 |

OTHER REFERENCES

Kressman et al.: Journal of Chem. Soc. 1949, pp. 1208–1210.

Barber et al.: Analyst, vol. 81, pp. 18–25, 1956.

SAMUEL H. BLECH, *Primary Examiner.*

WILLIAM H. SHORT, *Examiner.*

C. A. WENDEL, *Assistant Examiner.*